US008724955B2

(12) United States Patent
LaVoie et al.

(10) Patent No.: US 8,724,955 B2
(45) Date of Patent: May 13, 2014

(54) EJECTION MECHANISM AND ACTUATOR FOR SMALL FORM FACTOR PLUGGABLE UNIT

(76) Inventors: Renaud LaVoie, Laval (CA); Eric Dudemaine, Crabtree (CA)

( * ) Notice: Subject to any disclaimer, the term of this patent is extended or adjusted under 35 U.S.C. 154(b) by 274 days.

(21) Appl. No.: 13/081,862

(22) Filed: Apr. 7, 2011

(65) Prior Publication Data

US 2012/0257865 A1 Oct. 11, 2012

(51) Int. Cl.
*G02B 6/00* (2006.01)

(52) U.S. Cl.
USPC .......................................................... 385/134

(58) Field of Classification Search
None
See application file for complete search history.

(56) References Cited

U.S. PATENT DOCUMENTS

| | | | | |
|---|---|---|---|---|
| 6,533,603 | B1 * | 3/2003 | Togami | 439/372 |
| 7,325,975 | B2 * | 2/2008 | Yamada et al. | 385/54 |
| 7,347,633 | B2 * | 3/2008 | Minota | 385/92 |
| 2004/0228582 | A1 * | 11/2004 | Yamada et al. | 385/81 |
| 2004/0240792 | A1 * | 12/2004 | Minota | 385/53 |

* cited by examiner

*Primary Examiner* — Sung Pak

(57) ABSTRACT

The present ejection mechanism is for a small form-factor pluggable (SFP) unit. The ejection mechanism comprises a latch, and an actuator. The latch is located on a bottom surface of a housing of the SFP unit, and maintains the SFP unit within a chassis when in an engaged position. The actuator comprises an actuating end, a pivot and a distal end. The actuating end has a part emerging from the SFP unit. Upon upward movement of the actuating end, the pivot leads a downward movement of the distal end and application of a pressure on a bottom of the SPF unit thereby disengages the SPF unit from the chassis.

6 Claims, 6 Drawing Sheets

EJECTION MECHANISM AND ACTUATOR FOR SMALL FORM FACTOR PLUGGABLE UNIT

The present disclosure relates to an ejection mechanism for a small form factor pluggable unit, and more particularly to an actuator, insertable within a small form factor pluggable unit, for actuating an ejection mechanism.

BACKGROUND

Small Form-factor Pluggable (SFP) units are standardized units adapted to be inserted within a chassis. The MSA standard describes the size of the SFP unit, so as to ensure that all SFP fully-compliant and partially-compliant units may be inserted smoothly within one same chassis, i.e. inside cages, ganged cages, stacked cages and belly-to-belly cages.

SFP units may be designed with various types of exterior connectors, such as coaxial connectors, optical connectors, and any other type of electrical connector.

As SFP units are small in dimensions, it is possible to limit the size of the chassis required to host several units simultaneously. And with the constant reduction of the electric, electronic and optic components used within the SFP units, the only limitation known today is due to the size of the connectors from which signals are received and transmitted there from.

However, removal of a SFP unit from a chassis is a problem due to the small size and relative fragility of actuators. SFP units are typically kept in place by use of a latch on a bottom face. Removing a SFP unit requires applying sufficient pulling or pushing force to move a cage latch or a latch itself, to overcome a resistance of a spring loaded latch.

The SFP unit may thus be broken by an excessive or misapplied force to disengage the SFP unit from the chassis.

BRIEF DESCRIPTION OF THE DRAWINGS

In the appended drawings, provided for exemplary purposes only, similar references denote like parts.

DETAILED DESCRIPTION

The foregoing and other features of the present will become more apparent upon reading of the following non-restrictive description of examples of implementation thereof, given by way of illustration only with reference to the accompanying drawings. Like numerals represent like features on the various drawings.

The present disclosure relates to an ejection mechanism for use with a small form-factor pluggable (SFP) unit. The SFP unit comprises a generally elongated housing having a front panel, a back panel, a top, a bottom and two sides, and corresponds at least partially to standardized dimensions. A latch is placed on one of the top, bottom or two sides, for maintaining the SFP Unit in place within a chassis when the latch is in a resting position. The latch may be kept in its resting position, in the absence of a counter-acting force, for example by use of a spring.

In the context of the present SFP unit, the following terminology is used: “SFP” designates a Small Form Factor Pluggable Unit corresponding to SFP and SFP+ standards.

Figure 1:
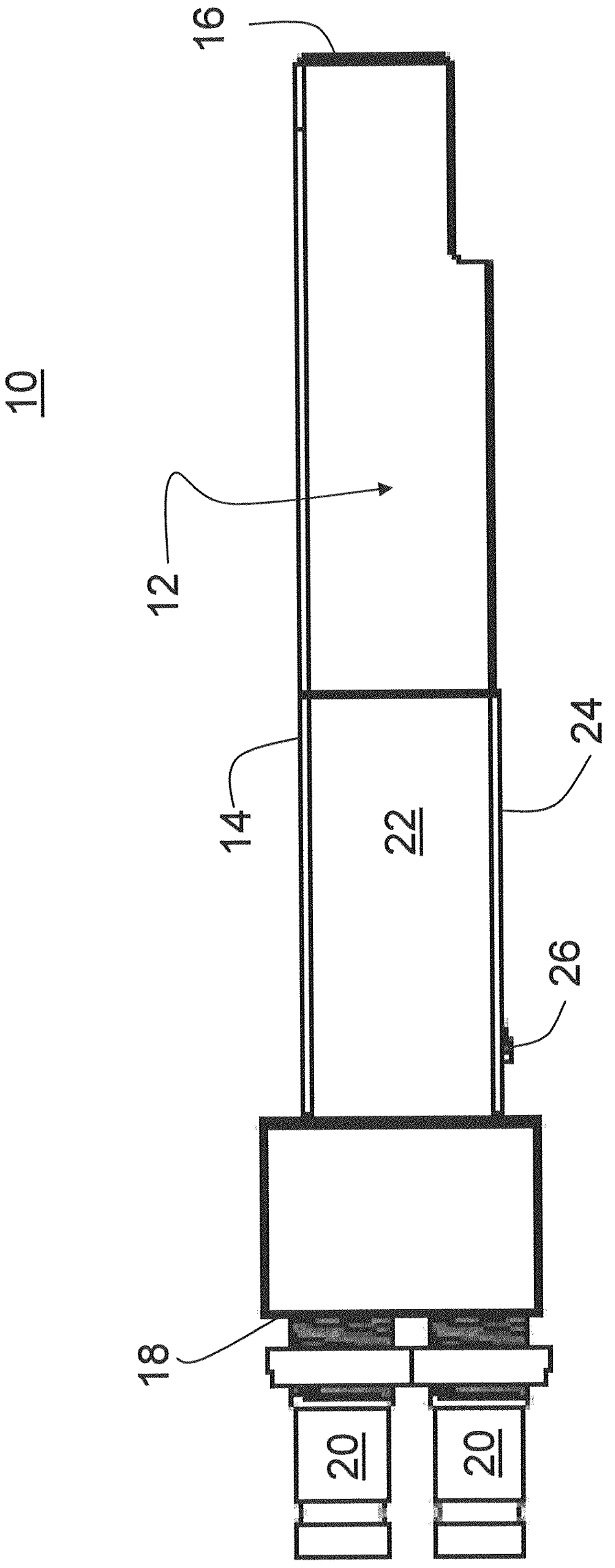
FIG. 1 is a side elevation view of a SFP unit.

Reference is now made to FIG. 1, which is a side elevation view of a SFP unit. A SFP unit 10 comprises a housing 12. The housing defines a top 14, a bottom 24 and two sides 22 (only one side is shown). The housing 12 is at least partially of dimensions in compliance with the SFP and SFP+ standards or having functional dimensions based on the SFP or SFP+ standards.

The SFP unit 10 further comprises a back panel 16 affixed to the housing 12. The back panel 16 may comprise one or more connectors (not shown), for example PCB fingers, to connect the SFP unit to another SFP unit or to a backplane of a chassis.

The SFP unit 10 further comprises a front panel 18 affixed to the housing 12. The front panel may comprise one or more electrical and/or optical connectors, for example co-axial connectors 20, for connecting the SFP unit to external devices, using for example co-axial cables, category 5 (CAT5) cables, twisted copper pairs, optical cables or fibers, and the like. The front panel also comprises an aperture (not shown) from which emerges an actuating end of an ejection mechanism, which is described hereinbelow.

A latch 26 is shown in a resting position on the bottom 24. In another embodiment, the latch may be positioned on the top 14 or on any side 22 of the SFP unit 10. The latch 26 could be moved closer to the front panel 18 or closer to the back panel 16. The placement of the latch 26 of FIG. 1 is exemplary and is non-limiting.

Figure 2:
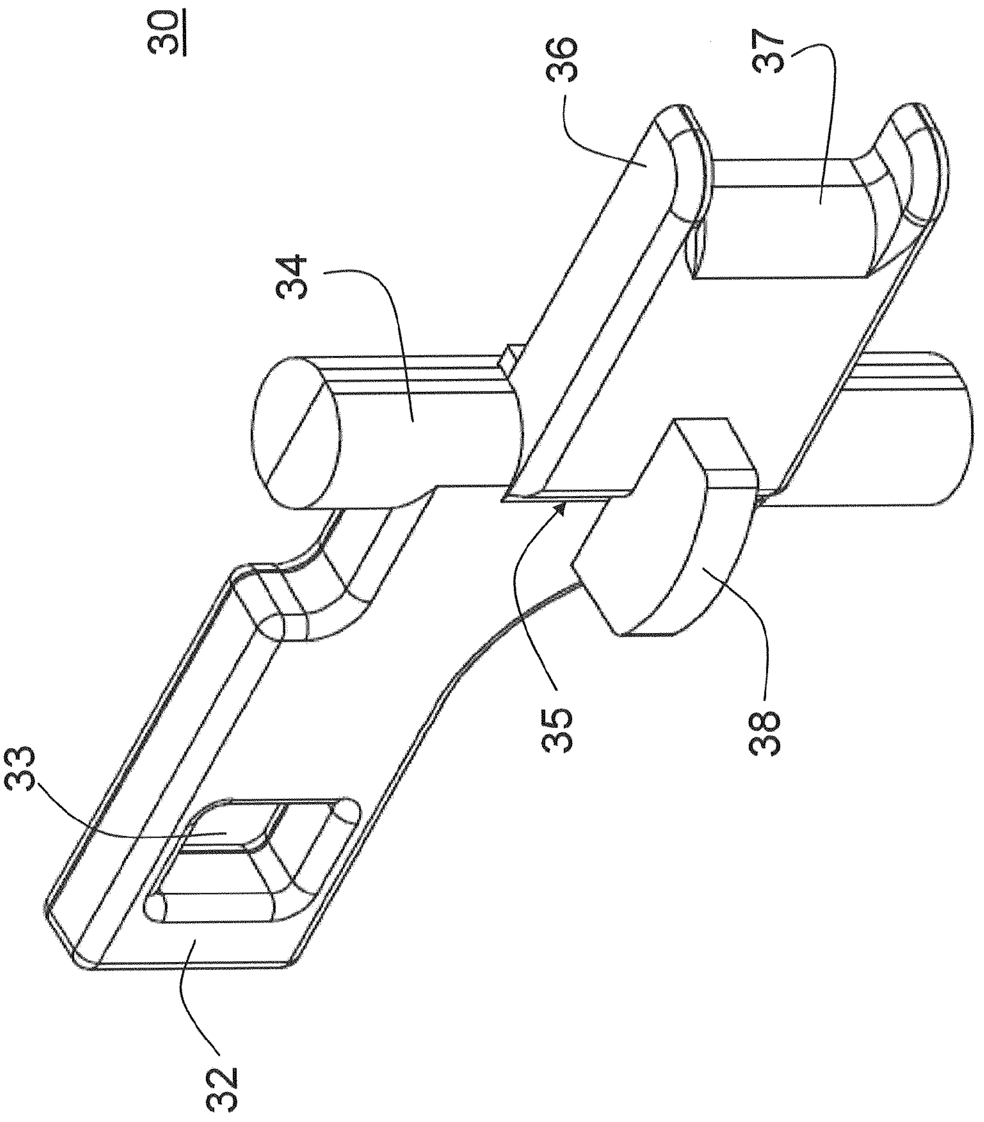
FIG. 2 is a perspective view of an actuator for an ejection mechanism, according to an exemplary embodiment.
Figure 6:
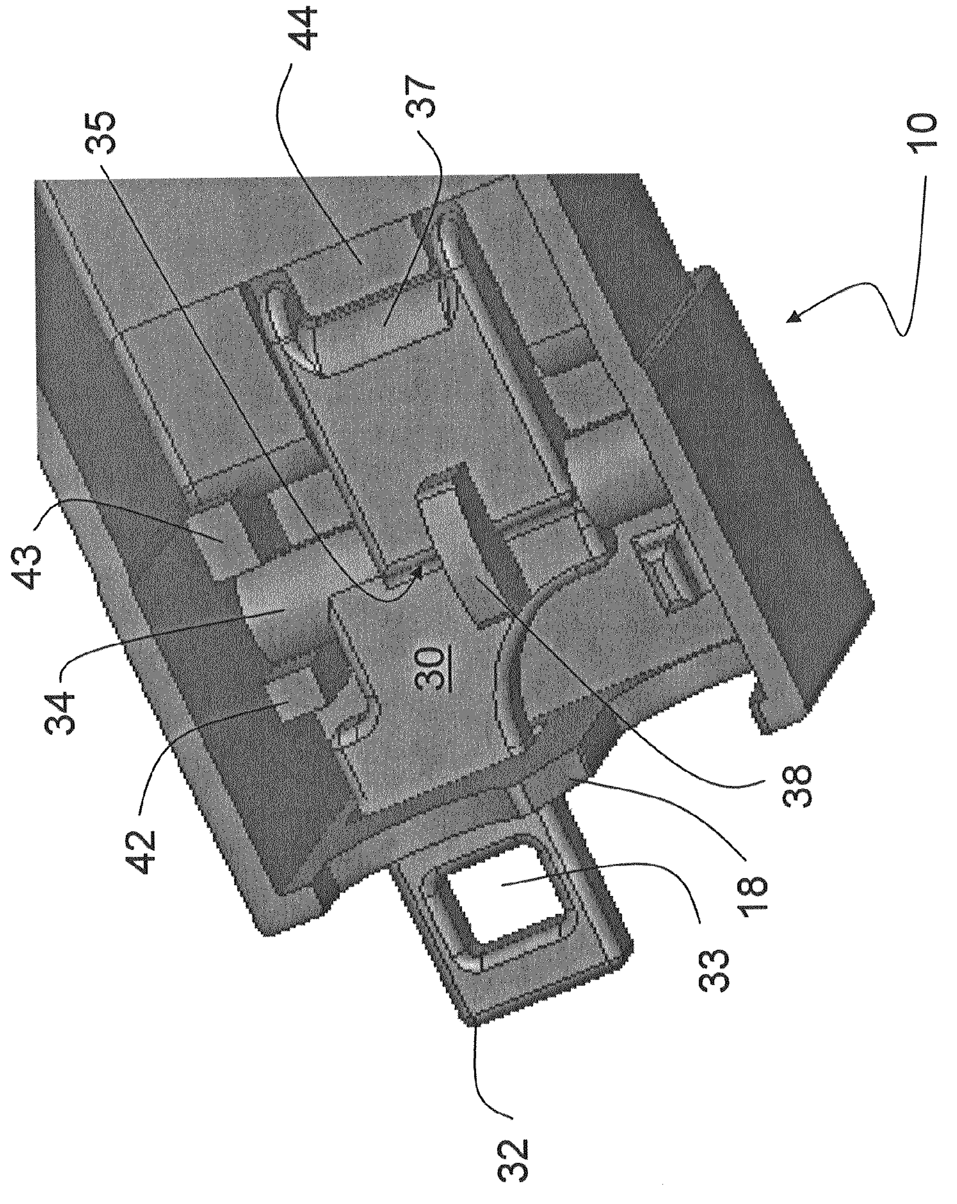
FIG. 6 is a top perspective, partial cutaway view of the SFP Unit of FIG. 1 with the actuator of FIG. 2 in place with the SFP unit.

Reference is now concurrently made to FIGS. 2 and 6, where FIG. 2 is a perspective view of an actuator for an ejection mechanism, according to an exemplary embodiment, and FIG. 6 is a top perspective, partial cutaway view of the SFP unit of FIG. 1 with the actuator of FIG. 2 in place. The actuator 30 comprises an actuating end 32 having an aperture 33, a pivot 34, a distal end 36 further comprising a recessed portion 37, and a lever 38. The actuating end 32, the pivot 34, the distal end 36, the recessed portion 37 and the lever 38 may be constructed as multiple components assembled together, or may be built as one. single component such as a molded component. The actuator 30 is pivotally engaged in the SPF unit. Relative movement between the actuating end 32 and the distal end 36 occurs around the pivot 34.

In an embodiment, all components of the actuator 30 are made of a nickel plated, diecast zinc alloy. Of course, other material may be used to make this device, for example various metals or plastics.

Figure 3:
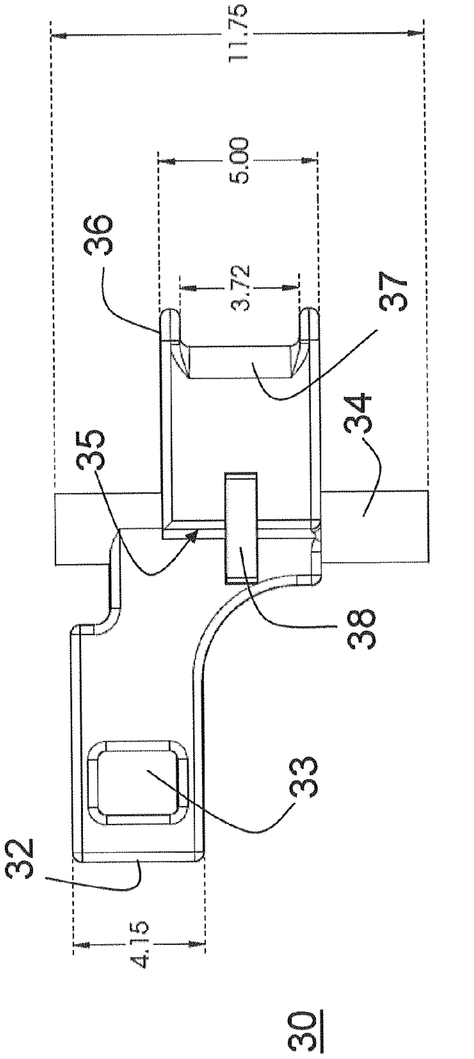
FIG. 3 is a top plan view of the actuator of FIG. 2.
Figure 4:
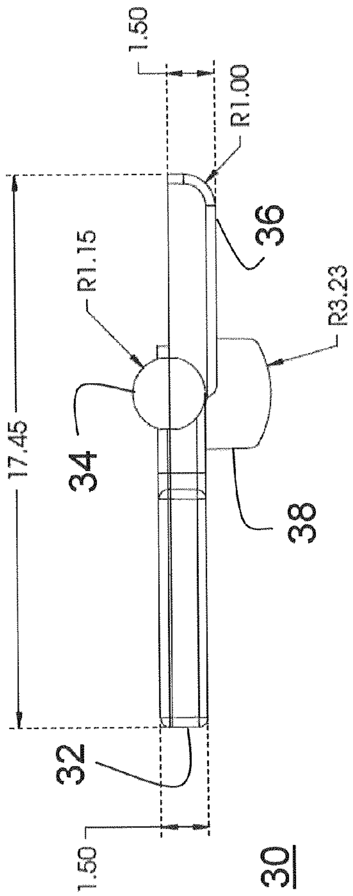
FIG. 4 is a side elevation view of the actuator of FIG. 2.

Reference is now made to FIGS. 3 and 4, which are respectively a side elevation view and a top plan view of the actuator of FIG. 2. All dimensions shown are in millimeters. These dimensions are exemplary while being consistent with the SFP and the SFP+ standard formats. Indications such as “R1.15” for the pivot 34 relate to radiuses, in millimeters, of a shown curved component. The actuating end 32 has a length such that a tip of the actuating end emerges from the housing 12 when the actuator 30 is in position within the SFP unit 10.

Figure 5:
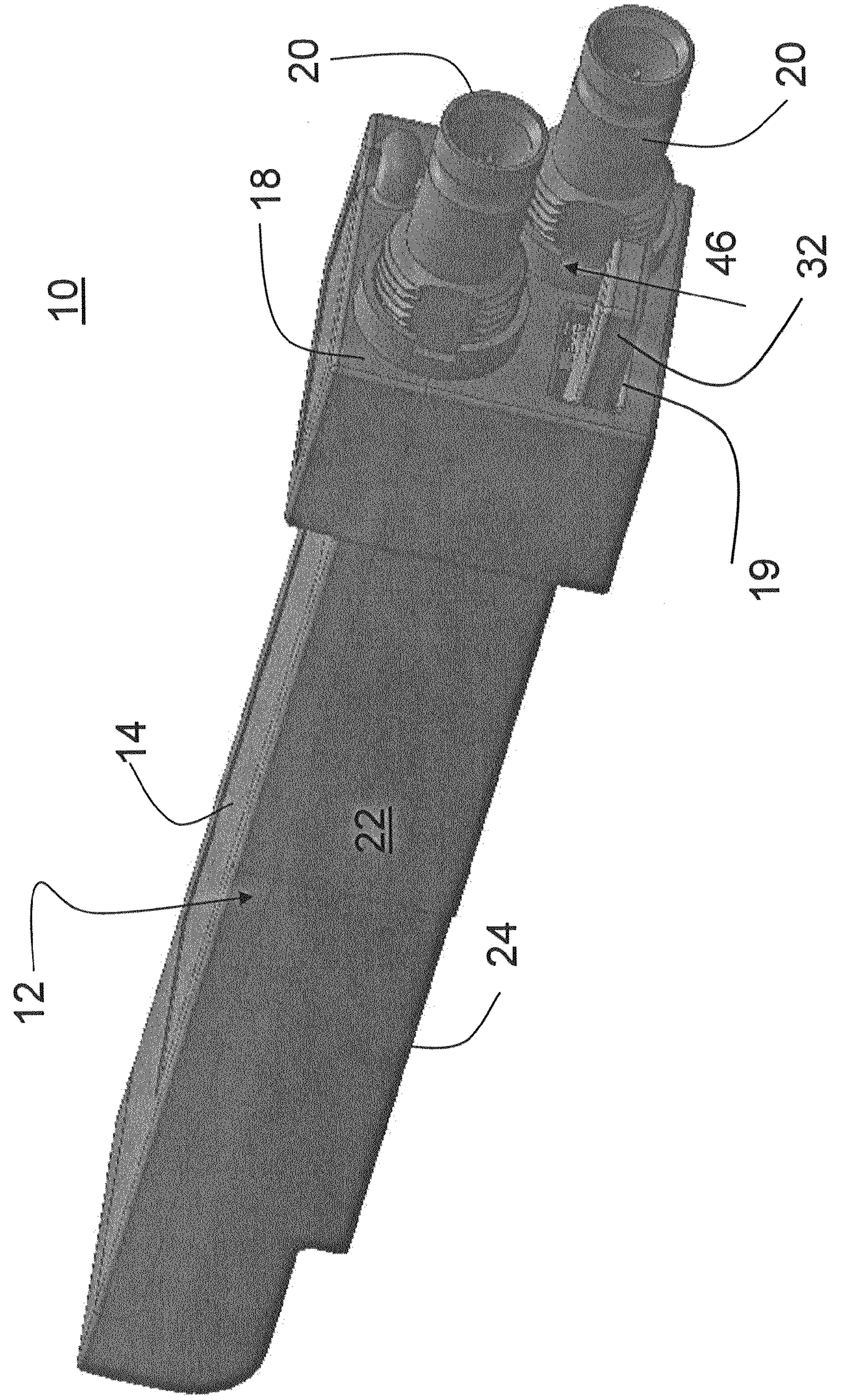
FIG. 5 is a perspective view of the SFP unit of FIG. 1, showing an actuating end of the actuator of FIG. 2.

Considering now FIG. 5, which is a perspective view the SFP unit of FIG. 1, showing an actuating end of the actuator of FIG. 2, it may be observed that the actuating end 32 emerges from an aperture 19 in the front panel 18 of the SFP unit 10.

Figure 7:
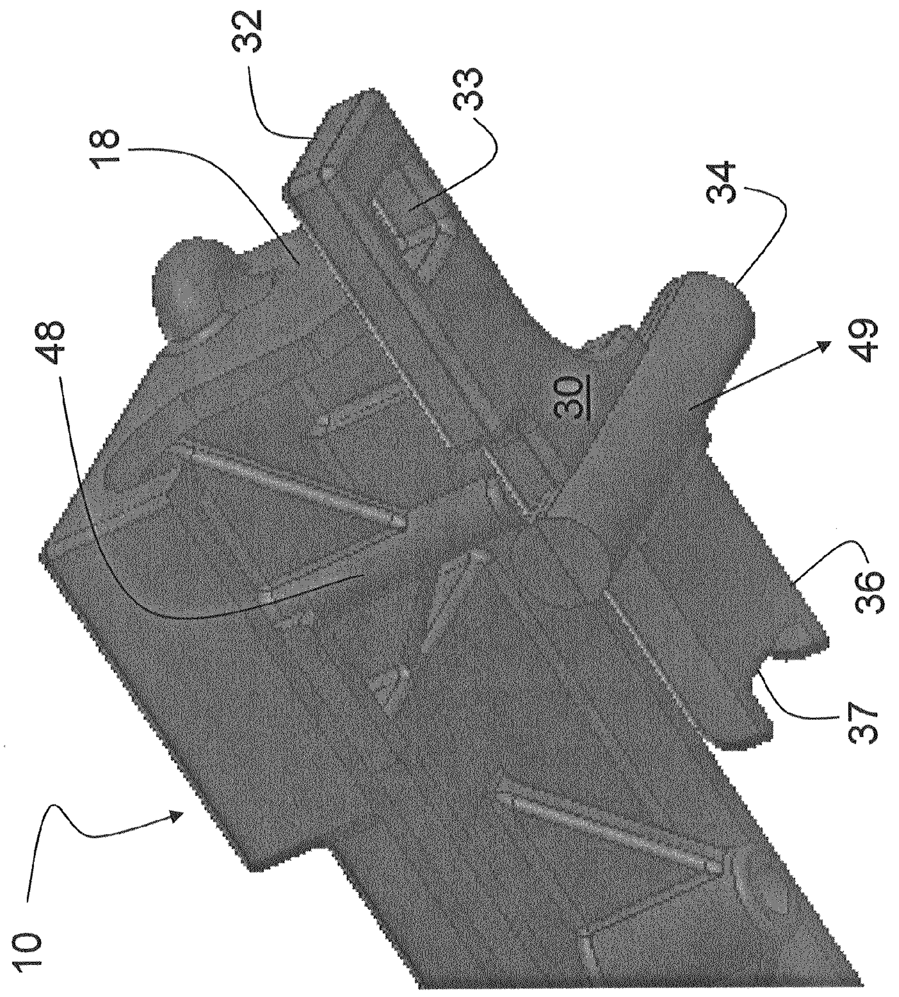
FIG. 7 is a bottom perspective, partial cutaway view of the SFP unit of FIG. 1 with the actuator of FIG. 2 in place with the SFP unit.

Reference is now made to FIGS. 6 and 7, which are respectively a top perspective, partial cutaway view and a bottom perspective, partial cutaway view of the SFP unit of FIG. 1 with the actuator of FIG. 2 in place with the SFP unit. The top 14 is omitted from FIG. 6 in order to show the actuator 30. Likewise, the bottom 24 is omitted from FIG. 7. The actuator 30 is for a large part internal to the SFP unit 10, except for a portion of the actuating end 32. The pivot 34 is prevented from longitudinal movement within the SFP unit 10 by blocks 42 and 43. Other means could alternately be used to prevent longitudinal movement of the pivot 34 within the SFP unit 10. The recessed portion 37 may be designed so as to abut or be proximate to a latch 44, or so as to partially surround the latch 44.

Pressure applied in the direction of arrow 46 on the actuating end 32 forces movement of the actuating end 32, which leads, partial rotation of the pivot 34 and the distal end 36. An elevated abutment 38 prevents vertical displacement of the ejection mechanism and further facilitates partial rotation of the pivot 34 because of its slightly circular shape. The elevated abutment 38 is in contact with the top 14 when installed within the SFP unit 10. In addition to the elevated abutment 38, the ejection mechanism further comprises a vertical prevention mechanism 48, such as for example a stud, internal to the SFP Unit 10, for preventing vertical displacement of the pivot 34 in the SFP unit 10. When the SFP unit 10 is engaged in a chassis, the pressure applied in the direction of arrow 46 disengages the SFP unit 10 from the cage. For doing so, the present ejection mechanism transfers in one aspect the pressure applied in the direction of arrow 46 around the latch 26 thereon and by counter-acting any force, such as pressure from a spring (not shown), maintaining the latch 26 in its resting position. In another aspect, the present ejection mechanism transfers the pressure applied in the direction of arrow 46 around a cage latch (not shown), thereby disengaging the SFP unit 10 from the cage in which it is engaged. The ejection mechanism, being internal to the SFP unit 10, increases robustness and ease of use.

Although the present ejection mechanism and actuator have been described in the foregoing description by way of illustrative embodiments thereof, these embodiments can be modified at will, within the scope of the appended claims without departing from the spirit and nature of the present mechanism and actuator device.

What is claimed is:

1. An ejection mechanism for a small form-factor pluggable (SFP) unit comprising:

a latch located on a bottom surface of a housing of the SFP unit, for maintaining the SFP unit within a chassis when in an engaged position;

an actuator comprising an actuating end, a pivot, a distal end and an elevated abutment for assisting in rotation of the pivot, the actuator being internal to the SFP unit except for a portion of the actuating end emerging from the SFP unit;

wherein upon upward movement of the actuating end, the pivot leads a downward movement of the distal end and application of a pressure on a bottom of the SPF unit thereby disengaging the SPF unit from the chassis.

2. The ejection mechanism of claim 1, wherein the SFP unit further comprises blocks preventing longitudinal movement of the pivot in the SFP unit.

3. The ejection mechanism of claim 2, further comprising a vertical prevention mechanism for preventing vertical movement of the pivot in the SFP unit.

4. The ejection mechanism of claim 3, wherein the vertical prevention mechanism comprises a stud.

5. The ejection mechanism of claim 1, wherein the pressure on the bottom of the SPF unit disengages the latch of the SFP unit.

6. The ejection mechanism of claim 1, wherein the pressure on the bottom of the SFP unit disengages a locking mechanism of the chassis.

* * * * *

UNITED STATES PATENT AND TRADEMARK OFFICE

CERTIFICATE OF CORRECTION

PATENT NO. : 8,724,955 B2
APPLICATION NO. : 13/081862
DATED : May 13, 2014
INVENTOR(S) : La Voie et al.

It is certified that error appears in the above-identified patent and that said Letters Patent is hereby corrected as shown below:

Title Page

Item (12) Delete, “LaVoie et al.” and replace with, -- La Voie et al. --.

Item (76), Inventors: Delete, “LaVoie” and replace with, -- La Voie --.

Signed and Sealed this
Twelfth Day of August, 2014

Michelle K. Lee
*Deputy Director of the United States Patent and Trademark Office*